United States Patent [19]

De Rooy et al.

[11] 4,169,747

[45] Oct. 2, 1979

[54] COMPOSITION FOR ACCELERATING THE SETTING OF CALCINED GYPSUM AND THE PRODUCT FORMED THEREBY

[75] Inventors: Felix J. De Rooy; Thell D. Daniel; Erle C. Annes, all of Plaster City; Billy G. Arnold, El Centro, all of Calif.

[73] Assignee: United States Gypsum Company, Chicago, Ill.

[21] Appl. No.: 803,503

[22] Filed: Jun. 6, 1977

Related U.S. Application Data

[62] Division of Ser. No. 624,367, Oct. 21, 1975, Pat. No. 4,059,456.

[51] Int. Cl.$^2$ .............................................. B32B 13/00
[52] U.S. Cl. .................................... 156/39; 106/114; 106/315
[58] Field of Search ............... 106/111, 114, 115, 315; 156/39, 40, 41, 42, 43, 44, 45, 46

[56] References Cited

U.S. PATENT DOCUMENTS

| 2,078,198 | 4/1937 | King | 106/315 |
|---|---|---|---|
| 2,856,304 | 10/1958 | Kirk | 106/111 |
| 2,957,774 | 10/1960 | Selbe et al. | 106/111 |
| 3,053,673 | 10/1962 | Walker | 106/315 |
| 3,108,008 | 10/1963 | King et al. | 106/111 |
| 3,573,947 | 4/1971 | Kinkade et al. | 106/315 |
| 3,723,145 | 3/1973 | Haldas et al. | 106/315 |
| 3,725,090 | 4/1973 | Lyass et al. | 106/111 |
| 3,772,045 | 11/1973 | Haldas et al. | 106/315 |
| 3,813,312 | 5/1974 | Kinkade et al. | 156/39 |
| 3,864,141 | 2/1975 | Uchikawa et al. | 106/315 |
| 3,870,538 | 3/1975 | Burkard et al. | 106/315 |

*Primary Examiner*—William A. Powell
*Assistant Examiner*—William H. Thrower
*Attorney, Agent, or Firm*—Samuel Kurlandsky; Robert H. Robinson; Kenneth E. Roberts

[57] ABSTRACT

A composition for accelerating the setting of an aqueous calcined gypsum slurry, the composition comprising finely ground calcium sulfate dihydrate and a lignosulfonate. The composition, when added to an aqueous calcined gypsum slurry, accelerates the setting process and shortens the set time period as determined by the temperature rise set test procedure. The composition is useful for making gypsum wallboard.

12 Claims, No Drawings

COMPOSITION FOR ACCELERATING THE SETTING OF CALCINED GYPSUM AND THE PRODUCT FORMED THEREBY

This is a Divisional application of application Ser. No. 624,367, filed Oct. 21, 1975, now U.S. Pat. No. 4,059,456.

BACKGROUND OF THE INVENTION

(1) Field of Invention

The present invention relates to the process of setting a calcined gypsum slurry, is more particularly concerned with a composition for the delayed accelerating of the setting of an aqueous calcined gypsum slurry to form gypsum wallboard or plasterboard.

(2) Prior Art

Gypsum board or plasterboard has long been a large volume commercial article of commerce. Generally, gypsum board is manufactured by dispersing calcined gypsum in water and adding thereto a lightweight pregenerated foam to control the finished density of the slurry and the subsequent board. Additives conventionally used in minor amounts include accelerators, bond protecting agents, fibrous reinforcements, and consistency reducers. Typical of accelerators are calcium sulfate dihydrate, potassium sulfate, ammonium sulfate, and aluminum sulfate. Bond protecting agents are usually cereal flours or starches. The fibrous reinforcements may be either cellulosic or glass. Consistency reducing agents are typified by the lignosulfonates, of which ammonium lignosulfonate is particularly advantageous. These additives are used in minor quantities in relation to the total weight of the board core, and represent, in total, less than 5%, usually less than 2%, of the weight of the finished core.

The calcined gypsum slurry containing the desired added ingredients is prepared in continuous mixers, as for example a primary-secondary mixer combination described in Lane et al., U.S. Pat. No. 3,359,146, or a multi-pass mixer described in Camp U.S. Pat. No. 2,660,416. The mixed slurry is continuously deposited on a paper cover sheet moving beneath the mixer. A second paper cover sheet is applied thereover and the board is passed under a roll or rolls to determine the thickness. The continuous strip thus formed is conveyed on a belt until the calcined gypsum has set, and the strip is thereafter cut to form boards of desired length, which boards are conveyed through a drying kiln to remove excess moisture.

The most common form of accelerator used for setting a calcined gypsum slurry is calcium sulfate dihydrate. This material appears in many forms many of which can be used when properly prepared by grinding to a high degree of fineness. This material has been found to be an excellent accelerator. However, it has been found that when the material is stored prior to use, it is highly susceptible to becoming calcined, particularly in the presence of calcined gypsum which has been bagged while still warm or in the presence of moisture or heat generally. U.S. Pat. Nos. 2,078,199 and 3,813,312 have disclosed that when sugar or soluble dextrin are ball-milled together with the calcium sulfate dihydrate, the material functions to prevent dehydration of the accelerator, even when subjected to various atmospheric conditions on storage. Additionally, U.S. Pat. No. 3,870,538 has disclosed that starch may be finely ground together with calcium sulfate dihydrate to serve as a preservative of the accelerator. However these materials, particularly sugar, have become very expensive to a degree almost prohibitive of their use.

SUMMARY OF THE INVENTION

Accordingly, it is an object of the present invention to provide a novel composition for accelerating the setting reaction of an aqueous calcined gypsum slurry.

It is a further object to provide a composition of the type described which maintains its effectiveness even under varying atmospheric conditions normally encountered during storage.

It is a further object to provide an accelerator composition which is relatively inexpensive.

It is another object to provide an accelerator composition which enhances the strength of the finished board.

It is a still further object of the invention to control the hydration of a calcined gypsum slurry to provide relatively slow temperature rise during the early portions of the hydration period as for example for the first three minutes, followed by a rapid temperature rise toward the end of the hydration period.

It is still another object of the invention to provide a method for preparing gypsum wallboard and to a product prepared by the said method having excellent strength and excellent adhesion between the hydrated gypsum core and the paper cover sheets affixed thereto.

Still further objects and advantages of the invention will appear from the following description.

According to the invention, a composition for accelerating the setting of a calcined gypsum slurry is prepared by finely mixing or grinding together calcium sulfate dihydrate and a lignosulfonate. The resulting accelerator composition may be stored for extended periods and subsequently added to a gypsum slurry. The accelerator composition substantially reduces the hydration period, and results in a gypsum board having excellent properties. The lignosulfonates are inexpensive materials and are commonly used in gypsum slurries to reduce water demand. If desired, the amount of lignosulfonate added to produce the accelerator may be subtracted from the amount used to reduce water demand, since the lignosulfonate added to the accelerator composition may also function to reduce water demand. However, the amount used to form the accelerator is of almont negligible amount and expense, so that a saving is accomplished even without the use of this expediency. Generally from about 0.5% to about 99% lignosulfonate based on total by weight of the accelerator composition may be used, although a preferred range is about 3% to about 25%.

DESCRIPTION OF THE PREFERRED EMBODIMENTS

The lignosulfonates, or lignin sulfonates as they are sometimes known, are anionic polyelectrolytes having molecular weights varying between 1,000 and 20,000. They are obtained as waste products from the sulfite pulping of wood, and are either used in the form obtained or else processed to increase purity and surface activity. The organic structure of the materials has not been completely determined but it is known that the basic lignin monomer unit is a substituted phenylpropane. It can be theorized that a repeating unit of the polymeric lignosulfonate could have the following structure, as shown in Table 1.

Table 1

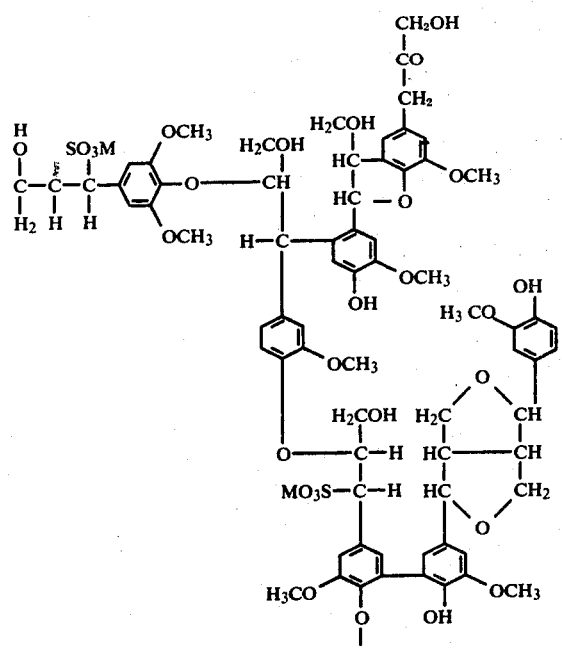

Lignosulfonates are marketed by many companies under various trademarks. A number of lignosulfonate materials are manufactured and marketed by American Can Company, Greenich, Connecticut, and are listed under their trademarks together with their chemical analyses and physical characteristics, as follows in Table 2. The materials are prepared by refining crude lignosulfonate.

The following lignosulfonates are also produced by the American Can Company and are unmodified or partially modified organics derived from the sulfite pulping of wood. These materials contain lignosulfonates of a broad range of molecular size, oligosaccharides, as well as wood sugars or wood sugar derivatives. The materials and their analysis and properties are produced below in Table 3 as obtained from Bulletin No. 131 of American Can Company.

Table 2

| TYPICAL ANALYSIS (Moisture-Free Basis) | Marasperse C-21 | Marasperse CB | Marasperse N-22 |
|---|---|---|---|
| pH-3% Solution | 7.0–8.2 | 8.5–9.2 | 7.5–8.5 |
| Total Sulfur as S.% | 6.8 | 2.6 | 7.3 |
| Sulfate Sulfur as S.% | .3 | .1 | 1.0 |
| Sulfite Sulfur as S.% | .09 | 0 | .12 |
| CaO.% | 5.2 | .03 | .55 |
| MgO.% | .3 | Trace | .3 |
| $Na_2O$.% | 6.1 | 9.9 | 13.2 |
| Reducing sugars, % | 1.5 | 0 | .8 |
| $OCH_3$.% | 7.9 | 12.7 | 7.7 |

| PHYSICAL CHARACTERISTICS | Marasperse C-21 | Marasperse CB | Marasperse N-22 |
|---|---|---|---|
| Usual Form | Powder | Powder | Powder |
| Moisture Content (Max., % $H_2O$) | 7.5 | 8.0 | 7.0 |
| Color | Brown | Black | Brown |
| Bulk Density (lbs./cu. ft.) | 35–40 | 43–47 | 35–40 |
| Solubility in Water (%) | 100 | 100 | 100 |
| Solubility in Oils and Most Organic Solvents (%) | 0 | 0 | 0 |
| Surface Tension, 1% Sol'n (in dynes/cm) | 49.4 | 51.4 | 52.8 |

Table 3

| TYPICAL ANALYSIS (Moisture-free Basis) | Norlig 11 | Norlig 11g | Norlig 11h | Norlig 41 | Norlig 41g | Norlig 41h | Norlig 11d | Norlig 11da | Norlig 12 | Norlig 21c |
|---|---|---|---|---|---|---|---|---|---|---|
| pH.3% solution | 4.0–4.5 | 6.0–7.5 | 6.0–7.5 | 3.0–3.5 | 6.0–7.5 | 6.0–7.5 | 7.5–9.2 | 3.5–4.5 | 3.0–3.7 | 7.3–8.7 |
| Total Sulfur as S.% | 5.4 | 6.1 | 4.9 | 5.9 | 5.8 | 6.1 | 5.3 | 5.6 | 5.5 | 6.0 |
| Sulfate Sulfur as S. % | Trace | 0.2 | 0.2 | 0.1 | 0.1 | 5.7 | 0.3 | 0.5 | 0.2 | .3 |
| CaO, % | 6.3 | 5.9 | 7.5 | 5.1 | 5.7 | 7.7 | 12.6 | 6.4 | 0.6 | 5.0 |
| MgO, % | 0.3 | 0.3 | 0.3 | 0.3 | 0.2 | 0.3 | 0.34 | 0.3 | 0.2 | .2 |
| $Na_2O$, % | — | 2.6 | — | — | 3.3 | — | — | Trace | 5.4 | 4.8 |
| Reducing Sugars, % | 21.4 | 18.0 | 18.0 | 17.3 | 16.2 | 16.0 | 2.0–5.0 | 2.0–5.0 | 21.0 | Less than 4.0 |
| $OCH_3$,% | 8.8 | 8.6 | 8.7 | 9.3 | 6.8 | 8.8 | 8.2 | 9.2 | 8.7 | 7.8 |

| PHYSICAL CHARACTERISTICS-Powder Form | Norlig 11 | Norlig 11g | Norlig 11h | Norlig 41 | Norlig 41g | Norlig 41h | Norlig 11d | Norlig 11da | Norlig 12 | Norlig 21C |
|---|---|---|---|---|---|---|---|---|---|---|
| Moisture Content | 4–6.5% | | | | | | | | | |
| Max. % $H_2O$ | 7.0 | — | 7.5 | 6.0 | — | — | 7.5 | 7.0 | 6.5 | 3.5–3.5 |
| Color | Brown | — | Brown | Brown | — | — | Brown | Brown | Brown | Brown |

Table 3-continued

| | | | | | | | | | | |
|---|---|---|---|---|---|---|---|---|---|---|
| Bulk Density (lbs./cu.ft.) | 33 | — | 33 | 36 | — | — | 32 | 32 | 35 | 33-35 |
| PHYSICAL CHARACTERISTICS-Liquid Form | | | | | | | | | | |
| Solids Content, % | 50-60 | 50-53 | 50-52 | 50-38 | 50-53 | 50-54 | — | — | 47 | 40-50 |
| Viscosity Brookfield at 77° F., cps. | 45-350 | 47-400 | 75-260 | 61-450 | 72-450 | 110-300 | — | — | 35 | 40-200 |

Other lignosulfonates suitable for use in the present invention are produced by Crown Zellerbach, Chemical Products Division, Camas, Wash., and are listed below in Table 4 together with their physical properties and analyses. The data are listed in the Bulletin entitled "The Orzan Products" page 13.

setting accelerator compositions according to the invention, the following tests designated as Examples 1-16, the results of which are shown in Table 5, were carried out.

In carrying out each test, a batch of 500 lbs. of a mixture of landplaster (calcium sulfate dihydrate) and

Table 4

| Physical Properties | Orzan A | Orzan AL-50 | Orzan S | Orzan SL-50 | Orzan P | Orzan PL-40 | Orzan AH-3 |
|---|---|---|---|---|---|---|---|
| Physical form | powder | liquid | powder | liquid | powder | liquid | powder |
| Color | lt.brown | brown | tan | brown | lt.brown | brown | dk.brown |
| pH of 25% solution | 4 | 4 | 7 | 7 | 5 | 7 | 2.5 |
| Water content, % | 6 | 50 | 5 | 50 | 5 | 60 | 4 |
| Bulk density, lbs./cu.ft. | 31 | | 31 | | 20 | | 18 |
| Specific gravity, 77° F. | | 1.82 | | 1.25 | | 1.18 | |
| Viscosity centipoise 77° F. | | 130 | | 130 | | 100 | |
| 32° F. | | 7800 | | 1800 | | | |
| Heat value, bfu/lb. | 9100 | | | | | | |
| Solubility in water % | | | | Completely soluble | | | 99 |
| Freezing point | | 23° F. | | 14° F. | | 27° F. | |
| Components | | | | | | | |
| Lignin sulfonio acids | 57 | | 48 | | 51 | | |
| Reducing sugars as glucose[2] | 15 | | 12 | | 13 | | 10 |
| Ash[2] | 1.5 | | 20 | | 5 | | 1.5 |
| Alkali-liberated ammonia | 3 | | 0.1 | | 2.5 | | 2 |
| Primary cation | ammonia | ammonia | sodium | sodium | ammonia | ammonia | ammonia |
| Elemental Analysis | | | | | | | |
| Carbon | 45.6 | | 41.6 | | | | |
| Hydrogen | 5.6 | | 5.0 | | | | |
| Sulfur | 6.4 | | 7.0 | | | | |
| Nitrogen | 3.7 | | 0.5 | | | | |
| Sodium | 0.05 | | 5.9 | | | | |

The following sugars make up the total sugar content.
| | |
|---|---|
| Mannose | 48% |
| Glucose | 15 |
| Xylose | 15 |
| Galactose | 10 |
| Arabinose | 6 |
| Fructose | less than 2 |

P.K. Mulvaney, H.D. Agar, Q. P. Peniston and J.L. McCarthy, JACS 73, 1255-7 (1951)

[2] Orzan A and Orzan B contain the following additional components.

| | Orzan A | Orzan B |
|---|---|---|
| Calcium | 0.2% | 0.2% |
| Potassium | 0.1 | 0.2 |
| Silicon | 0.4 | 0.02 |
| Magnesium | 0.05 | 0.03 |
| Manganese | 0.05 | 0.01 |
| Tin | 0.02 | 0.01 |
| Vanadium | 0.01 | 0.005 |

Traces aluminum, iron, chromium, nickel, titanium, boron, copper, barium, strontium, silver.

In addition to the materials listed above, a suitable lignosulfonate is marketed as LIGNISOL by Lignisol Chemicals Ltd., of Canada.

DESCRIPTION OF SPECIFIC EMBODIMENTS

In order to test the efficacies of various commercially available lignosulfonates for use in making gypsum the designated amount of lignosulfonate was ground together in a bath-type ball mill until the particle size was sufficiently reduced so that the mixture exhibited a surface area of at least 5,000 cm$^2$/g, and preferably greater than 10,000 cm$^2$/g, as measured by a Fischer Sub-sieve Sizer. Each accelerator composition was tested in a laboratory procedure developed for comparing the properties of various gypsum setting accelerator compositions. In carrying out the tests, in each case an amount of 180 c.c. of distilled water was placed in a 2-speed Waring Blender operated at high speed. A mixture of 200 g Southard molding plaster and 0.1 g accelerator composition was added to the blender and the lid closed. The slurry was mixed for 7 seconds and then emptied into an insulated plastic foam cup, and temperature vs. time was measured at intervals to obtain a temperature rise set (TRS) curve. From the curve the time at which the temperature stopped rising was determined and recorded as the TRS. Samples of each accelerator composition were then baked at 220° F. for 7 hours and retested in the same manner. The remaining samples of accelerator were exposed for 44 hours at 80° F., at 80% relative humidity and then tested by the same procedure described above. FIG. 5 shows the data obtained from the tests for the various materials tested. The Southard molding plaster used in each case is a very pure highly stable calcium sulfate hemihydrate (stucco). In each case 0.1 g accelerator composition was utilized with 200 g Southard molding plaster. These values were arbitrarily chosen and maintained constant for purposes of the test. In practice in forming plasterboard, other varying proportions of accelerator composition to stucco may be utilized depending on the magnitude of the set period desired.

The properties desired in a good gypsum-setting accelerator composition are, first of all, that the composition be one which delays setting of the gypsum composition slurry to which it is added for about 3 minutes, permitting the composition to be formed into board sheet. It is then desired that setting take place rapidly and reach completion as measured by the above-described procedure within a period of not more than about 20 minutes and preferably not more than 10 minutes, as determined by termination of temperature rise.

ates in decreasing order of efficacy, that is, with increasing fresh TRS values. Although all the examples exhibited accelerator properties suitable for commercial use in producing wallboard, those having the shortest TRS values are preferable. Additionally, when comparing various percentages of a particular lignosulfonate (Norlig 11) to landplaster by weight, the 25% composition appeared to have the lowest TRS, and the 1% composition the highest, although all proved to be sufficiently good for use in making plasterboard. Example 6 utilizing an accelerator composition in which conventional sugar replaced lignosulfonates, and Examples 14-16, in which C-211 Starch, a commercially available acid-processed starch was used, as disclosed in U.S. Pat. No. 3,087,538, are provided as comparison examples. As can be seen, both 3% and 5% Norlig 11 accelerator compositions were materially superior to that formed with 5% sugar, or 10%-50% starch.

In order to correlate the results shown in Table 5 with practical gypsum board fabrication, gypsum board was produced on standard factory machinery utilizing those accelerator compositions shown in Table 5 which exhibited excellent properties. In carrying out the tests standard factory machinery, methods, and formulations were utilized. The formulations were tailored for the particular size of the equipment. In formulating commercial gypsum slurries, generally a larger amount of accelerator composition in proportion to the stucco is required in order that the temperature rise set will be complete before the formed gypsum wallboard enteres the kiln where it is dried, since once the board enters the kiln and is heated, hydration resulting in setting terminates. Various additives commonly used in making gypsum board were also utilized, but are not all emunerated since they do not affect the action of the accelerator composition. Table 6 below shows the formulations and results obtained from the indicated accelerator composition utilizing the particular lignosulfonates and in the particular percentages listed. In every case gypsum wallboard acceptable for commerical use was obtained.

TABLE 5

| Example | Accelerator Additive Type | % By Weight of Accelerator | Temperature Rise Set In Minutes Fresh | After Baking at 220° F. for 7 hrs. | After 44 hrs. Exposure to 80° F., 80% RH | % Combined Water After Baking At 220° F. for 7 hrs. | Surface cm²/gm |
|---|---|---|---|---|---|---|---|
| 1 | NORLIG-11 | 25% | 15.16 | 15.41 | 15.50 | 27.8 | 14,240 |
| 2 | NORLIG-11 | 10% | 15.33 | 16.66 | 15.75 | 18.2 | 12,240 |
| 3 | NORLIG-11 | 5% | 15.50 | 16.25 | 16.84 | 15.5 | 12,837 |
| 4 | NORLIG-11 | 3% | 16.00 | 17.35 | 17.00 | 13.1 | 11,961 |
| 5 | MARASPERSE C-21 | 3% | 16.00 | 18.16 | 19.25 | 10.6 | 12,531 |
| 6 | SUGAR | 5% | 16.16 | 16.32 | 16.84 | 18.3 | 13,157 |
| 7 | LIGNOSOL | 3% | 16.50 | 23.50 | 18.67 | 8.0 | 13,850 |
| 8 | ORZAN-G | 3% | 16.58 | 18.66 | 17.75 | 14.3 | 11,696 |
| 9 | NORLIG-11 | 1% | 16.75 | 20.25 | 18.00 | 9.7 | 11,961 |
| 10 | ORZAN A | 3% | 17.50 | 18.75 | 19.25 | 13.4 | 10,121 |
| 11 | NORLIG 21-C | 3% | 17.75 | 20.58 | 19.90 | 11.6 | 11,696 |
| 12 | MARASPERSE B-22 | 3% | 17.58 | 18.50 | 19.25 | 13.6 | 11,696 |
| 13 | MARASPERSE CBOS-3 | 3% | 20.16 | 23.85 | 23.25 | 9.6 | 10,526 |
| 14 | C-211 Starch | 10% | 16.15 | 16.00 | 18.15 | | |
| 15 | C-211 Starch | 25% | 16.35 | 16.40 | 19.45 | | |
| 16 | C-211 Starch | 50% | 17.05 | 17.30 | 19.15 | | |

The examples set out in Table 5 above are arranged with the various commercial trademarked lignosulfon-

TABLE 6

| ACCELERATOR ADDITIVE | | Example 14 3% Norlig 11 | Example 15 25% Norlig 11 | Example 16 3% Marasperse C-21 | Example 17 3% Norlig 11 |
|---|---|---|---|---|---|
| Gauging Water | #/MS' | 1069 | 1069 | 1069 | 1069 |
| Foam Water | #/MS' | 216 | 216 | 205 | 205 |

TABLE 6-continued

| ACCELERATOR ADDITIVE | | Example 14<br>3% Norlig 11 | Example 15<br>25% Norlig 11 | Example 16<br>3% Marasperse C-21 | Example 17<br>3% Norlig 11 |
|---|---|---|---|---|---|
| Total Water | #/MS' | 1285 | 1285 | 1274 | 1274 |
| Temp. Rise Set | Minutes | 10.8 | 9.5 | 10.2 | 10.5 |
| Fiber | #/MS' | 5.2 | 5.2 | 5.2 | 5.2 |
| Starch | #/MS' | 6.8 | 6.8 | 6.8 | 6.8 |
| Accelerator | #/MS' | 2.2 | 2.2 | 2.4 | 2.4 |
| Foaming Agent | #/MS' | .49 | .49 | .49 | .50 |
| Foam Air | Cu. Ft./MS' | 13.32 | 13.32 | 12.14 | 12.07 |
| Foam Weight | #/Ft.3 | 12.90 | 12.90 | 13.59 | 13.59 |
| Wetting Agent | #/MS' | 1.7 | 1.97 | 1.97 | 1.97 |
| Retarder | #/MS' | 1.0 est | 1.0 est | 1.0 est | 1.0 est |
| Dry Stucco Weight | #/MS' | 1487 | 1583 | 1564 | 1584 |

In order to compare accelerator compositions according to present invention with prior art accelerators, accelerator compositions were prepared as described above, one utilizing 3% Norlig 11 and the other utilizing 5% sucrose, a prior art accelerator composition disclosed and claimed in U.S. Pat. No. 3,813,312. The results are shown below in Table 7. In each case commercially acceptable gypsum wallboard was obtained having good strength properties and good paper cover sheet adhesion. Since equally good wallboard was obtained from both accelerator compositions, the economy resulting from utilizing 3% Norlig 11 at 7.5 cents per pound over that of utilizing 5% sucrose at 54 cents per pound can be readily seen.

TABLE 7

| ACCELERATOR ADDITIVE | | Example 18<br>3% Norlig 11 | Example 19<br>5% Sugar |
|---|---|---|---|
| Gauging Water | #/MS'* | 1099 | 1099 |
| Foam Water | #/MS' | 215 | 215 |
| Total Water | #/MS' | 1312 | 1312 |
| Temp. Rise Set | Minutes | 10 | 10 |
| Fiber | #/MS' | 6 | 6 |
| Starch | #/MS' | 6.2 | 6.2 |
| Accelerator | #/MS' | 3.5 | 3.5 |
| Foaming Agent | #/MS' | .47 | .47 |
| Foam Air | Cu. Ft./MS' | 10.97 | 10.97 |
| Foam Weight | #Ft.3 | 12.19 | 12.19 |
| Wetting agent | #/MS' | 2.9 | 2.9 |
| Retarder | Oz/MS' | 2.4 | 2.4 |
| Dry Stucco Weight | #/MS' | 1526 | 1498 |

*Designates pounds/thousand square feet of ½ inch board

As described above, in carrying out the laboratory tests to determine the relative efficacy of various accelerator compositions in terms of Temperature Rise Set, an amount of 0.1 g of accelerator composition was arbitrarily utilized with 200 g of calcined gypsum, the accelerator composition being 0.05% by weight with respect to the weight of the calcined gypsum. However, where longer setting times can be tolerated, as little as 0.01% by weight of the accelerator composition with respect to the weight of calcined gypsum may be utilized.

In the larger scale tests from which the data for Tables 6 and 7 were obtained, approximately 0.15% by weight of accelerator composition with respect to the weight of dry calcined gypsum was utilized. This proportion appears to be a suitable value for general plant production. However, under particular conditions, as low as 0.05% by weight of accelerator composition to calcined gypsum could be used for factory production. The relative amounts used in factory production could be increased to about 1.5% by weight of accelerator composition to calcined gypsum in order to obtain a more rapid Temperature Rise Set. However, when the amount is increased above 1.5%, no substantial benefit is obtained and additionally the material cost increases.

Further, when a proportion greater than 1.5% is utilized, the accelerator composition may reduce the period of low temperature rise which is normally desired for the first 3 minutes, and result in a set before the gypsum slurry has been adequately poured onto the forming belt and shaped to desired form and thickness. Generally a proportion range of about 0.05% to about 1.5% of accelerator composition to calcined gypsum for factory production is suitable, and 0.15% to 1.5% preferred.

In preparing the accelerator compositions according to the invention described above, finely ground landplaster was used. However, if desired other forms of gypsum may be used including by-product gypsum such as that resulting from the citric acid process.

The term #/MS' where used denotes pounds per thousand square feet of ½ inch board.

Although in the description of the invention above the accelerator composition of the invention was tested for use in the setting of gypsum slurries, the catalyst may also be used in setting inorganic cementitious mixtures wherever a gypsum accelerator is utilized, as for example, in hydraulic cements such as portland cement.

The accelerator composition of the present invention has several advantages over prior art compositions. The lignosulfonates are extremely inexpensive, and much more so that sugar or starch. They are readily available in large quantities even in periods of severe food shortage when sugar or starch would not be available for commercial processing of gypsum. Further, as shown in the results of the experiments, the efficacy of lignosulfonate-containing accelerator compositions may in some cases be greater than that of conventional materials even when used in smaller amounts. Further, the material is easy to use and does not involve any hazards to the health of factory workers.

It is to be understood that the invention is not to be limited to the exact details of operation or compositions shown and described as obvious modifications and equivalent will be apparent to one skilled in the art.

We claim:
1. A method of making gypsum wallboard, comprising
   (a) forming a dry accelerator composition by grinding together calcium sulfate dihydrate and a lignosulfonate to fine particle size, said lignosulfonate being present in an amount from about 0.5% to about 99% by weight of said composition,
   (b) mixing a minor proportion of said acclerator composition and a major proportion of calcium sulfate hemihydrate with water to form an aqueous slurry,

(c) depositing said slurry on a surface and permitting said slurry to set, and drying the gypsum wallboard formed thereby.

2. A method according to claim 1, wherein said lignosulfonate has a wood sugar associated therewith.

3. A method according to claim 2, wherein the particles of said composition have a surface area of from about 5,000 to about 20,000 square centimeters per gram as determined by a Fisher Sub-sieve Sizer.

4. A method according to claim 2, wherein the total amount of said lignosulfonate and associated wood sugar is from about 3% to about 75% by weight of said accelerator composition.

5. A method according to claim 2, wherein said lignosulfonate is ammonium lignosulfonate.

6. A method according to claim 2, wherein said lignosulfonate is sodium lignosulfonate.

7. A method according to claim 2, wherein said lignosulfonate is calcium lignosulfonate.

8. A method according to claim 2, wherein said lignosulfonate is in the acid form.

9. A method according to claim 2, wherein the amount of said lignosulfonate and associated wood sugar is from about 5% to about 50% by weight of said composition.

10. A method according to claim 2, wherein said lignosulfonate is in the solid state.

11. A method according to claim 2, wherein the amount by weight of said accelerator composition is from about 0.01% to about 1.5% of said dry calcined gypsum.

12. A method according to claim 2, wherein the amount by weight of said accelerator composition is from about 0.15% to about 1.5% of said dry calcined gypsum.

* * * * *